United States Patent [19]
Zediker et al.

[11] Patent Number: 5,781,229
[45] Date of Patent: Jul. 14, 1998

[54] MULTI-VIEWER THREE DIMENSIONAL (3-D) VIRTUAL DISPLAY SYSTEM AND OPERATING METHOD THEREFOR

[75] Inventors: Mark S. Zediker, Florissant; Alan J. Bacon, Oakville; Robert R. Rice, Chesterfield, all of Mo.

[73] Assignee: McDonnell Douglas Corporation, St. Louis, Mo.

[21] Appl. No.: 802,901

[22] Filed: Feb. 18, 1997

[51] Int. Cl.$^6$ .................................................. H04N 13/04
[52] U.S. Cl. ................... 348/51; 250/206.1; 345/419; 348/55; 348/59
[58] Field of Search .................. 348/51, 52, 55, 348/59; 250/206.1; 352/63; 345/419; H04N 13/04

[56] References Cited

U.S. PATENT DOCUMENTS

| | | | |
|---|---|---|---|
| 3,304,833 | 2/1967 | Bullard | 250/558 |
| 4,414,565 | 11/1983 | Shanks | 348/44 |
| 4,470,044 | 9/1984 | Bell | 348/51 |
| 4,799,103 | 1/1989 | Muckerheide | 348/51 |
| 4,870,600 | 9/1989 | Hiraoka | 348/51 |
| 4,951,151 | 8/1990 | Sorenson et al. | 348/52 |
| 5,002,387 | 3/1991 | Baljet et al. | 352/63 |
| 5,067,098 | 11/1991 | Moellering et al. | 345/426 |
| 5,146,465 | 9/1992 | Khan et al. | 372/45 |
| 5,182,670 | 1/1993 | Khan et al. | 359/359 |
| 5,192,987 | 3/1993 | Khan et al. | 257/183.1 |
| 5,283,858 | 2/1994 | Moellering et al. | 345/426 |
| 5,379,369 | 1/1995 | Komma et al. | 345/419 |
| 5,385,862 | 1/1995 | Moustakas | 117/108 |
| 5,394,202 | 2/1995 | Deering | 353/7 |
| 5,465,175 | 11/1995 | Woodgate et al. | 359/463 |
| 5,502,481 | 3/1996 | Dentinger et al. | 348/51 |
| 5,568,314 | 10/1996 | Omori | 348/51 |
| 5,574,836 | 11/1996 | Broemmelsiek | 348/51 |
| 5,644,427 | 7/1997 | Omori | 348/51 |

*Primary Examiner*—Howard Britton
*Attorney, Agent, or Firm*—Raymond Powell; Robert Westerlund

[57] ABSTRACT

A three-dimensional (3-D) virtual display system for displaying a flicker-free 3-D virtual image to each of N viewers randomly dispersed about a horizontally disposed viewing screen, where N is an integer greater than 1, includes a laser projector for generating N×M image pairs responsive to a video signal comprising the N×M image pairs, N transmitters associated with respective ones of the N viewers, each of the N transmitters generating a unique coded pulse, a detector for determining the position of each of the N viewers relative to the viewing screen responsive to the respective unique coded pulse and for generating respective position data, a graphics processor for generating the video signal responsive to the position data, and N selectors associated with the N viewers for selecting the M image pairs out of the N×M image pairs allocated to each of the N viewers, respectively. The projector includes an electron-beam-pumped semiconductor laser (EBSL) screen, e.g., a vertical cavity surface emitting laser screen. In an exemplary case, the video signal carries in excess of 1000 image pairs per second, which is far beyond the capability of conventional cathode ray tubes (CRTs) to display. A method for generating N 3D virtual images and a corresponding video signal are also described.

30 Claims, 10 Drawing Sheets

MULTI-VIEWER THREE DIMENSIONAL (3-D) VIRTUAL DISPLAY SYSTEM AND OPERATING METHOD THEREFOR

BACKGROUND OF THE INVENTION

The present invention relates generally to 3-dimensional (3-D) display systems. More specifically, the present invention relates to 3-D display systems generating multiplexed image pairs which are simultaneously perceived by multiple viewers as 3-D virtual images regardless of the proximity of the viewers to one another or their positions relative to the viewing screen. A method for simultaneously generating multiplexed image pairs which can be viewed by multiple, widely-separated viewers is also disclosed.

The use of a true three dimensional model to depict three-dimensional (3-D) data permits the presentation of data which is clearly superior to that currently available using conventional two-dimensional displays. For example, the Army uses a "sandtable" or "terrain board" for operational planning. This "terrain board" consists of a complete miniature of a military operational area which is fabricated from sand and organic miniatures. The terrain board provides the viewers with a detailed depiction of the lay of the land, particularly portraying any landmarks, trees, shrubs, buildings and vehicles, if the scale permits. It will be appreciated that all of the viewers are presented with a perspectively correct image whatever the viewer's location with respect to the "terrain board." The "terrain board" is used to augment the planning of a mission by providing the soldier with a "true" representation of the terrain and forces in the operational area of interest. However, it will be readily apparent that these "terrain boards" have a number of drawbacks, e.g., the "terrain boards" are labor intensive to build and difficult to update once constructed. Moreover, conventional "terrain boards" cannot be easily transported from one location to another location; such movements invariably damage the "terrain board" to some extent.

Numerous efforts to reduce the time and cost associated with producing accurate 3-D representations of such environmental features have been attempted over the years. U.S. Pat. No. 4,951,151 to Sorenson et al. discloses a projection display system which projects terrain features onto a 3-D surface relief map. While this system enables automation of at least part of the labor, i.e., permits a computer to place feature information on the relief map, the system still requires that an actual, geographically-correct relief map must first be constructed. Alternatively, U.S. Pat. Nos. 5,067,098 and 5,238,858 disclose methods for coloring the terrain to give it the proper color perspective in a conventional viewing system to allow the viewer to discriminate the various features of the terrain.

Due to the problems and drawbacks associated with actual 3-D displays, the need to display and disseminate vast amounts of data in a three-dimensional world using a two-dimensional display has existed for many years. Efforts to fully automate the process of generating 3-D images have focused on two competing technologies, holography and stereoscopic imaging.

Holographic displays, while providing a number of advantages, primarily with respect to the ability of multiple viewers to each see the "object" in true perspective, have a number of drawbacks making holographic projection systems of limited use in many applications. This is particularly true when system requirements dictate the need for a robust system since holographic image projectors are difficult to align initially. Moreover, even properly aligned holographic image projectors can drift in and out of focus when subjected to external vibrations. In addition, holographic projection systems tend to fade out in relatively bright ambient conditions.

Binocular stereoscopic imaging can be used to obtain a stereoscopic effect by utilizing a binocular parallax, which permits the viewer to perceive a three-dimensional (3-D) image from image data processed in the following manner. A two-dimensional image of a three-dimensional object, as that object would be seen by an observer's right eye, and another, different two-dimensional image, as that object would be seen by the observer's left eye are obtained, and this pair of images is selectively supplied to the respective right and left eyes of the viewer. Various techniques for displaying a pair of right and left images and selectively supplying them to the right and left eyes of the observer are used. For example, the following techniques are known:

(1) A pair of right and left images are displayed on a pair of two-dimensional displays or are divisionally displayed on right and left screens of a single two-dimensional display. These display images are supplied independently to the right and left eyes of the observer through a stereoscopic viewer consisting of a pair of optical systems.

(2) A pair of right and left images are displayed in different display colors on a single two-dimensional display so as to be superposed on each other. The images are observed through filter spectacles including two filters which are colored so that only the images corresponding to the appropriately designated eyes can be seen.

(3) Polarization filters having polarization axes which are perpendicular to the front surfaces of a pair of two-dimensional displays for respectively displaying a pair of right and left images are arranged to serve as output polarization filters. Images passing through these polarization filters are synthesized using a half-mirror. The observer observes the synthesized image through polarization spectacles comprising appropriate polarization filters corresponding to the above output polarization filters.

(4) A pair of right and left images are alternately displayed for one field or one frame on a single two-dimensional display (in a time-divisional manner). The observer observes the display images on the two-dimensional display through liquid-crystal shutter spectacles comprising liquid-crystal shutters which are alternately opened/closed in synchronism with the display of the right and left images. For example, U.S. Pat. No. 5,002,387 to Baljet et. al. discloses synchronization of the shutters on the viewer's glasses with a conventional theater projection system, thus offering one solution to the problem of simultaneously addressing everyone in the audience to provide the 3-D stereoscopic effect.

(5) A pair of right and left images are projected by a pair of right and left projectors from one surface side of a double lenticular screen in which the rear surfaces of two lenticular sheets are bonded to each other to sandwich a diffusion transmission layer therebetween. A display image is observed from the other surface side.

The pair of images can be obtained using a pair of cameras arranged so as to be separated by a predetermined distance, or can be obtained as before and after images as a single camera is moved appropriately. Alternatively, it will be appreciated that a pair of computer generated images can be developed wherein each of the images is generated using a slightly different viewpoint. When stereoscopy is performed in any manner, the position of the observer with respect to the display screen, i.e., the distance between the display screen and the observer and the angle from which the observer watches the display screen, are specified in advance when the pair of two-dimensional images is formed. When the observer watches the display screen from a position (distance and viewing angle) other than the specified position, i.e., those positions which are not appropriate for properly observing the display image, the observer experiences an unnatural stereoscopic effect or suffers from noticeable eye fatigue. Thus, in the conventional three-dimensional image display system using binocular stereoscopic imaging, the appropriate viewing position for obtaining a stereoscopic effect is specified, i.e., limited to a predetermined viewing point or observation position.

In an effort to overcome the acceptable position limitations found in a conventional 3-D imaging system, e.g., a 3-D computer-aided design (CAD) system, newer systems include components by which a single viewer can input information regarding his movements relative to the display screen, i.e., one or two cathode ray tubes (CRTs), so that the computer can develop left and right images based on a point of view corresponding to the viewer. For example, U.S. Pat. No. 4,870,600 to Hiraoka discloses a 3-D image display system used in a CAD system wherein the viewer provides information to a 3-D image data generator from a movement controller. The position information may be input manually via a mouse or joystick or may be derived from sensor information. U.S. Pat. No. 5,379,369 to Komma et al. discloses a similar system.

In contrast, U.S. Pat. No. 5,394,202 to Deering et. al. discloses the use of shuttered glasses with a half-silvered mirror to allow the viewer to simultaneously see virtual objects mixed with real objects. In addition, this patent describes a position tracking technique for locating the viewer in the context of a table top projection system using the half-silvered mirror to view the images.

Figure 1A:
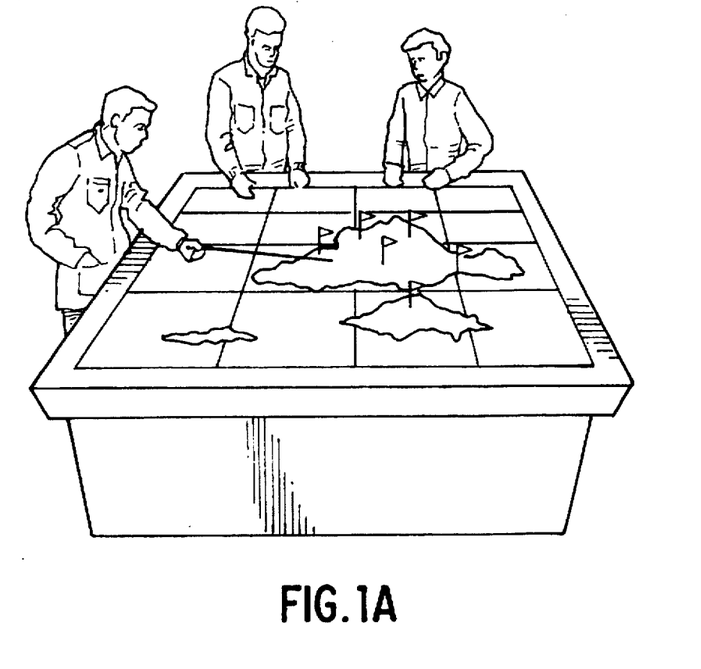
FIGS. 1A and 1B are pictorial representations of a "terrain table" which are useful in explaining the problem associated with providing true perspective three dimensional (3-D) virtual images to viewers located at random locations with respect to the display screen of the inventive display system.
Figure 1B:
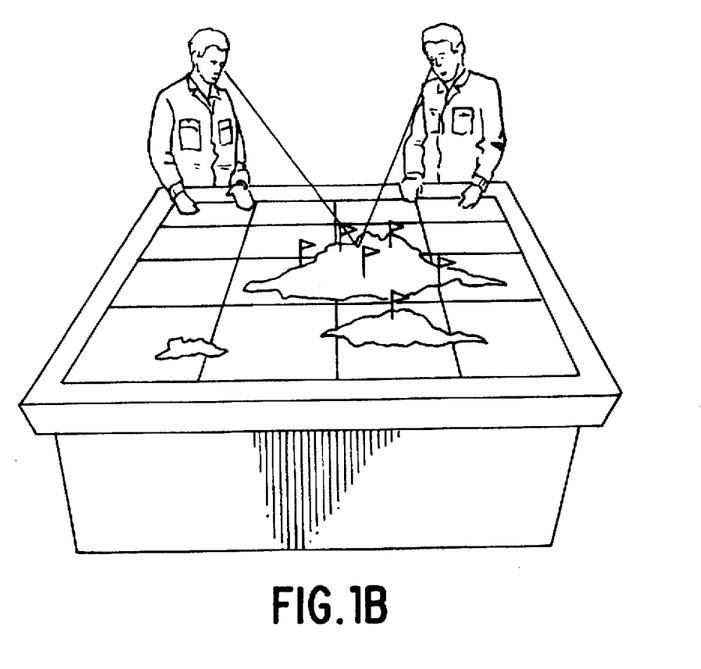

While the above-described systems can be used to generate a pair of images which one viewer, or one cluster of viewers, interprets as a 3-D image, it is extremely difficult to generate a pair of images which will be interpreted by a number of viewers surrounding a projection system, such as the "terrain board" illustrated in FIGS. 1A and 1B, as a 3-D virtual image. In a conventional 3-D imaging system, only one of the viewers depicted in FIG. 1A would "perceive" the 3-D image generated by left and right eye images, since only one of the viewers can occupy a position corresponding to the viewpoint used in generating the image pair at any given time. The other viewers will receive distorted or blurred images which will not be perceived as a 3-D image.

What is needed is a 3-D virtual display system wherein a stereoscopic image can be provided to respective viewers so as to permit each viewer to perceive a 3-D image irrespective of that viewer's position relative to the display screen. It will be appreciated that a more robust and rugged 3-D virtual display system would also be advantageous over conventional 3-D display systems.

SUMMARY OF THE INVENTION

Based on the above and foregoing, it can be appreciated that there presently exists a need in the art for a three dimensional (3-D) virtual display system which overcomes the above-described deficiencies. The present invention was motivated by a desire to overcome the drawbacks and shortcomings of the presently available technology, and thereby fulfill this need in the art. Moreover, the present invention solves this problem by presenting, in an exemplary case, the "terrain table" as a virtual 3-D display that can be quickly adapted and updated through a computer controlled display. In addition, the present invention is the only known solution that will enable multiple viewers to each see the "terrain board" in a proper perspective with respect to their position.

A significant advantage of the present invention is the production of N×M image pairs, where N is the number of viewers and M is the number of image pairs per second whereby each of the N viewers advantageously can perceive a flicker-free 3-D image exhibiting the perspective associated with the viewer's position relative to the 3-D virtual display system. The N separate image streams advantageously can be multiplexed so that 2×N×M images per second are displayed using the 3-D virtual display system. Alternatively, the 3-D virtual display system advantageously can be operated so that each viewer receives an identical image, irrespective of his position relative to the 3-D virtual display system, thus, for example, permitting each viewer to receive an image stream corresponding to an optimal viewing position, irrespective of the actual viewing position.

An object according to the present invention is to provide a 3-D virtual display system having a high speed refresh rate. Advantageously, the high speed refresh rate permits generation of N×M image pairs, wherein one set of the M image pairs can be perceived by each of the N viewers as a 3-D image. According to one aspect of the present invention, N is an integer greater than or equal to 10 while M is an integer at least one order of magnitude greater than N.

Another object according to the present invention is to provide a 3-D virtual display system having a brightness much greater than a conventional cathode ray tube (CRT). Preferably, the 3-D virtual display system according to the present invention includes an electron beam-pumped semiconductor laser (EBSL) screen in place of a conventional CRT.

It should be mentioned that the combination of the high speed refresh rate and the high brightness EBSL beams generated by the EBSL screen enable multiple images to be time sequenced without the persistence problems associated with CRT-based virtual displays. Advantageously, the high power of the EBSL screen enables the display system to be, on average, brighter than a normal CRT display screen. Moreover, N groups of M image pairs, where N is an integer much greater than two and M is the number of image pairs per second needed to project one 3-D virtual image per second, can be projected so that each of the N viewers perceives a true-perspective 3-D virtual image.

Still another object according to the present invention is to provide a 3-D virtual display system which senses the location of each of N viewers so as to permit generation of a true-perspective 3-D virtual image and subsequent transmission of the generated image to each one of the N viewers. According to one aspect of the present invention, two sensors can be used to determine the location, in three dimensions, of the N viewer's eyes with respect to the screen of the 3-D virtual display system.

A still further object according to the present invention is to provide a 3-D virtual display system including an EBSL screen which can operate at room temperature.

Yet another object according to the present invention is to provide a 3-D virtual display system which can be fabricated at low cost.

An additional object according to the present invention is to provide a 3-D virtual display system which is both rugged and compact. According to one aspect of the present invention, the 3-D virtual display system can be easily transported and setup. This aspect enables the use of the 3-D virtual display system at such diverse locations as trade shows and temporary, military headquarters.

A further object according to the present invention is to provide a 3-D virtual display system having the ability to time multiplex three-dimensional views at a sufficiently rapid rate that there is no perceived flicker of the image.

A still further object according to the present invention is to provide a 3-D virtual display system having the ability to time multiplex three-dimensional images without "ghosts," which ghosts are caused by the persistence of a conventional CRT monitor. Because of the persistence of the CRT, the images projected tend to decay away slowly. It will be noted that screen persistence is the primary factor which limits conventional CRTs from being able to provide a true perspective display. In contrast, the high brightness of the EBSL rear projection display combined with the high gain rear projection screen enables the projection time for each image to be sufficiently short that the persistence in the eye fuses the image rather than the persistence of the screen fusing the image. The net result is the ability to display thousands of images per second which allows 10's of viewers to each have their own true perspective view of the 3-D virtual display system.

These and other objects, features and advantages according to the present invention are provided by a video signal for driving a high-brightness, substantially zero-persistence image projector generating N 3-D virtual images from image pairs including left and right images. Preferably, the video signal includes N×M of the image pairs, wherein N is an integer greater than 1, wherein M is an integer equal to a number of image pairs per second required to produce a flicker-free one of the 3-D virtual images, wherein N×M is a total number of image pairs transmitted during a one second period, and wherein the N×M image pairs are multiplexed such that the M image pairs generating an Nth one of the 3-D virtual images are separated from one another by at least one of the N×M image pairs generating an (N−1)th one of the 3-D virtual images. According to one aspect of the invention, the total number, i.e., N×M, of the image pairs transmitted exceed 1000 image pairs. According to another aspect of the present invention, one second period comprises N×M time slots and the M image pairs generating the Nth one of the 3-D virtual images populate respective Nth, 2Nth, 3Nth, . . . , MNth ones of the N×M time slots.

These and other objects, features and advantages according to the present invention are provided by a three-dimensional (3-D) virtual display system for displaying a flicker-free 3-D virtual image to each of N viewers randomly dispersed about a viewing screen, where N is an integer greater than 1. Advantageously, the 3-D virtual display system includes a projector for generating N×M image pairs, a detector for determining the positions of the N viewers relative to the viewing screen and generating respective position data, a graphics processor for generating a video signal comprising the N×M image pairs responsive to the position data, and N selectors associated with the N viewers for selecting the M image pairs out of the N×M image pairs allocated to each of the N viewers, respectively. According to a first aspect of the present invention, M is an integer representing a number of image pairs required to produce one flicker-free 3-D virtual image. According to another aspect of the present invention, the N×M image pairs are multiplexed so as to evenly disperse the M image pairs throughout the N×M image pairs. Preferably, the projector includes an electron-beam-pumped semiconductor laser (EBSL) and, most preferably, the EBSL is a vertical cavity surface emitting laser. In an exemplary case, the video signal carries in excess of 1000 image pairs per second, which is far beyond the display capability of a conventional cathode ray tube.

These and other objects, features and advantages according to the present invention are provided by a three-dimensional (3-D) virtual display system for displaying a flicker-free 3-D virtual image to each of N viewers randomly dispersed about a horizontally disposed viewing screen, where N is an integer greater than 1. Preferably, the 3-D virtual display system includes a laser projector for generating N×M image pairs responsive to a video signal comprising the N×M image pairs, N transmitters associated with a respective one of the N viewers, each of the N transmitters generating a unique coded pulse, a detector for determining the positions of the N viewers relative to the viewing screen responsive to the respective unique coded pulse and for generating respective position data, a graphics processor for generating the video signal responsive to the position data, and N selectors associated with the N viewers for selecting the M image pairs out of the N×M image pairs allocated to each of the N viewers, respectively. Beneficially, the projector includes an electron-beam-pumped semiconductor laser (EBSL) and, most preferably, the EBSL is a vertical cavity surface emitting laser. In an exemplary case, the video signal carries in excess of 1000 image pairs per second, which is well beyond the display capability of conventional cathode ray tubes.

These and other objects, features and advantages according to the present invention are provided by a 3-D virtual display system for displaying a flicker-free 3-D virtual image to each of N viewers located at different positions about a viewing screen, where N is an integer greater than 1, including a first device for determining the different positions of the N viewers relative to the viewing screen responsive to N coded pulses associated with the respective N viewers and for generating respective position data, a second device for generating a video signal comprising N×M image pairs responsive to the position data, a third device for projecting the N×M image pairs on the viewing screen responsive to the video signal, and a fourth device associated with the N viewers for selecting the M image pairs out of the N×M image pairs allocated to each of the N viewers, respectively.

Finally, these and other objects, features and advantages according to the present invention are provided by a method for operating a three-dimensional (3-D) virtual display system for displaying a flicker-free 3-D virtual image to each of N viewers being located at different about a viewing screen, where N is an integer greater than 1, and wherein the 3-D virtual display system includes circuitry for determining the different positions of the N viewers relative to the viewing screen, a graphics processor for generating a video signal comprising N×M image pairs, a projector for projecting the N×M image pairs on the viewing screen, wherein M is an integer representing a number of image pairs required to produce one flicker-free 3-D virtual image, and N selectors associated with each of the N viewers, respectively. Advantageously, the method includes steps for determining the position of the N viewers relative to the viewing screen, generating respective position data indicative of the position of the N viewers, generating N×M image pairs responsive to the position data, multiplexing the N×M image pairs to thereby generate a video signal and to thereby evenly disperse the M image pairs throughout the N×M image pairs, projecting the N×M image pairs on the viewing screen responsive to the video signal, and selecting the M image pairs out of the N×M image pairs allocated to each of the N viewers, respectively.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

The functional problem that a three-dimensional (3-D) virtual display system according to the present invention is designed to solve is the display and dissemination of vast amounts of data depicting a three-dimensional world on a two-dimensional display. Although a preferred embodiment of the present invention will be described immediately below in terms of a virtual "terrain table," it should be noted that the present invention is not limited to this or any other application. The 3-D virtual display system according to the present invention is germane to a myriad of applications, i.e., wherever 3-D data display will enhance the viewer's understanding of that data. Thus, the 3-D virtual display system according to the present invention is applicable to display of such diverse information as military planning data, mass market entertainment shows, advertising and promotional information and educational materials.

Figure 2:
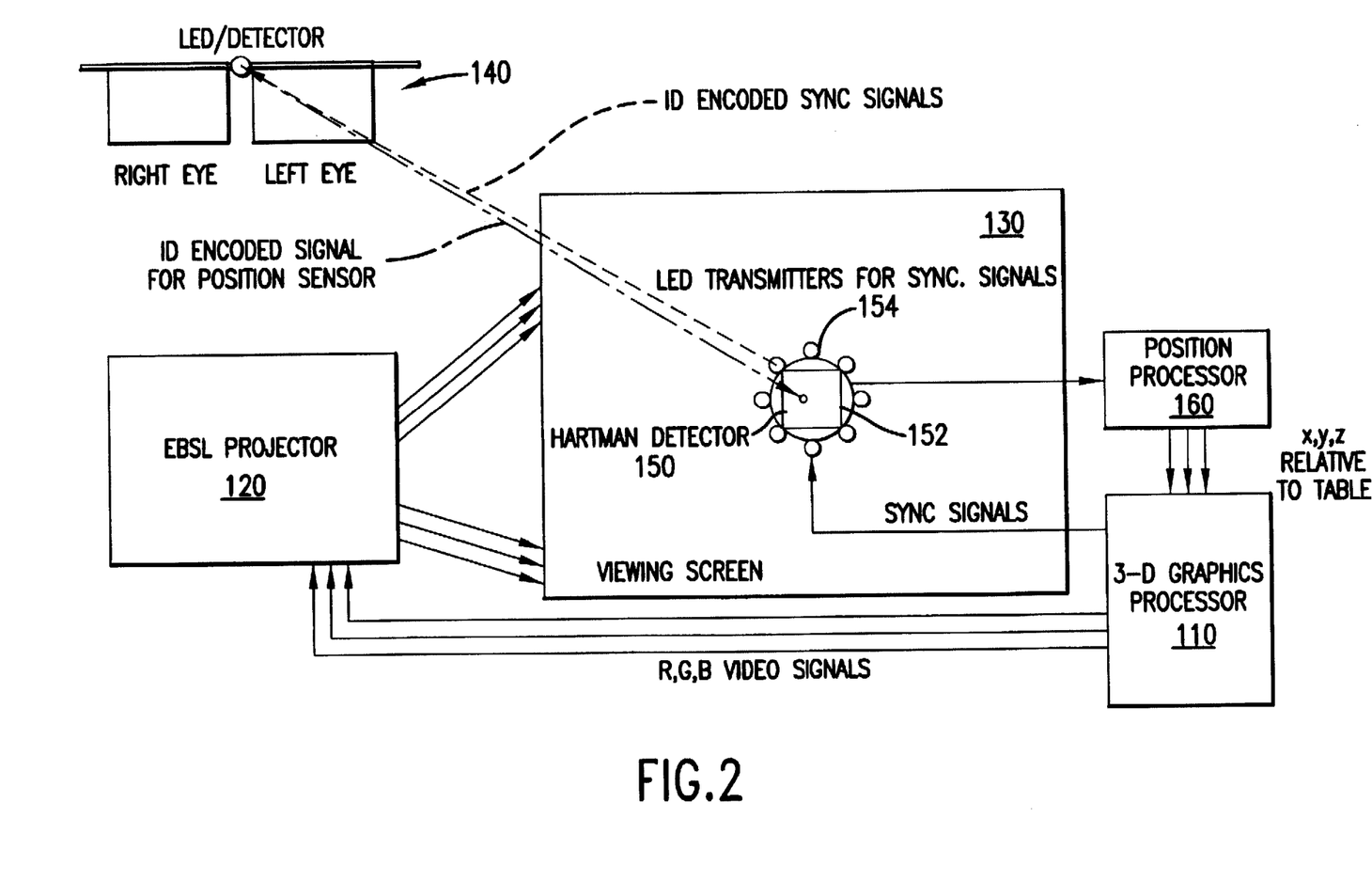
FIG. 2 is a high-level block diagram of the 3-D virtual display system according to the present invention.

According to one aspect of the present invention, the 3-D virtual display system 100 depicted in the high-level block diagram of FIG. 2 advantageously includes a high end graphic processor 110, which is used to create a 3-D rendered environment based on the same information that would be used to create a 3-D physical model of the data. In a "terrain table," for example, this information includes an accurate large and small scale depiction of the terrain, waterways, ground forces, airspace above the terrain, and any other relevant natural or man-made features. For small scale representations, standard military symbols could be used to depict enemy and friendly forces and equipment. For large scale terrain, actual representations of tanks, helicopters, tactical aircraft, ships, etc., advantageously can be shown, at least in the areas of interests. The 3-D rendered environment is applied to an electron-beam-pumped semiconductor laser (EBSL) projector 120 of the 3-D virtual display system 100, which projects a sequence of time multiplexed views to a single rear projection viewing or display screen 130.

Each viewer is provided with special glasses 140, which glasses are equipped with high speed shutters that alternately block the left and right eyes in synchronization with the time-multiplexed images projected on the viewing screen 130 by the EBSL projector 120. The operation of the glasses 140 will be described in greater detail below.

As illustrated in FIG. 2, a light-emitting diode 142 in the glasses 140 produces an infrared (IR) light beam which interacts with a position detector 150. The position detector 150, which is located proximate to projection screen 130, generates position information regarding each of the N viewers. Preferably, the position detector 150 is a Hartmann detector, which includes a wide angle lens (not shown) and a photo detector array 152, e.g., a charge-coupled device (CCD). The localized electrical signal generated by array 152 in response to an incident IR beam from glasses 140, the electrical signal advantageously can be interpolated by a position processor 160 into relative position data, i.e., angular data including a first angle representing angular displacement from some arbitrarily assigned 0° position and a second angle indicative of angular displacement above the plane of the display screen 130. In short, the detector 150 converts the angle of arrival of the IR light beam on the detector array 152 into relative position data.

It should be mentioned that the Hartmann detector 150 advantageously can be replaced by a radio frequency (RF) detector system or an ultrasonic detector system. The 3-D virtual display system 100 advantageously can include first and second Hartmann detectors 150' and 150" (See FIGS. 7 and 8.), which cooperatively can be used to determine the exact position of each of the N viewers. It will be appreciated that the intersection of the second angles produced by the Hartmann detectors 150', and 150" can be used to determine each viewer's individual viewpoint.

Figure 3:
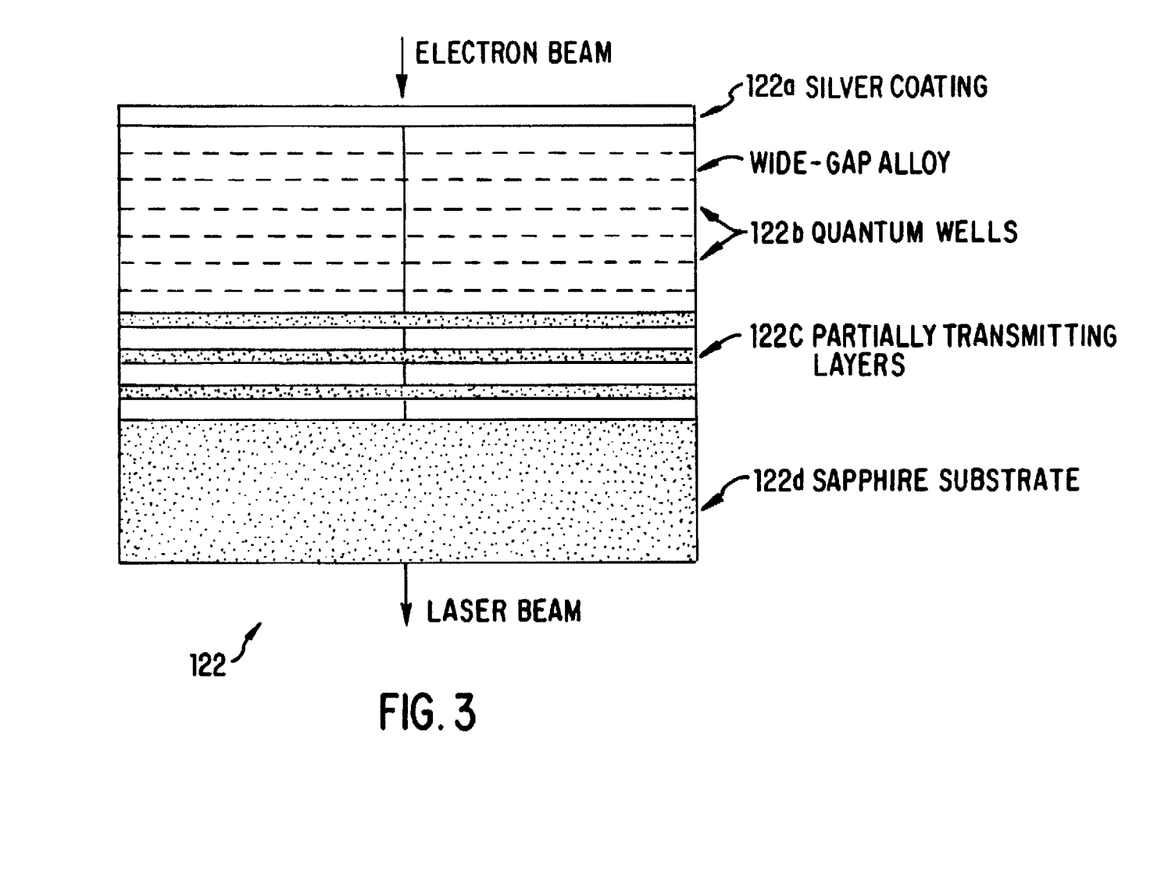
FIG. 3 is a representational view of an electron beam-pumped semiconductor laser (EBSL) screen which is useful in the system depicted in FIG. 2 for generating high brightness laser beams.
Figure 4:
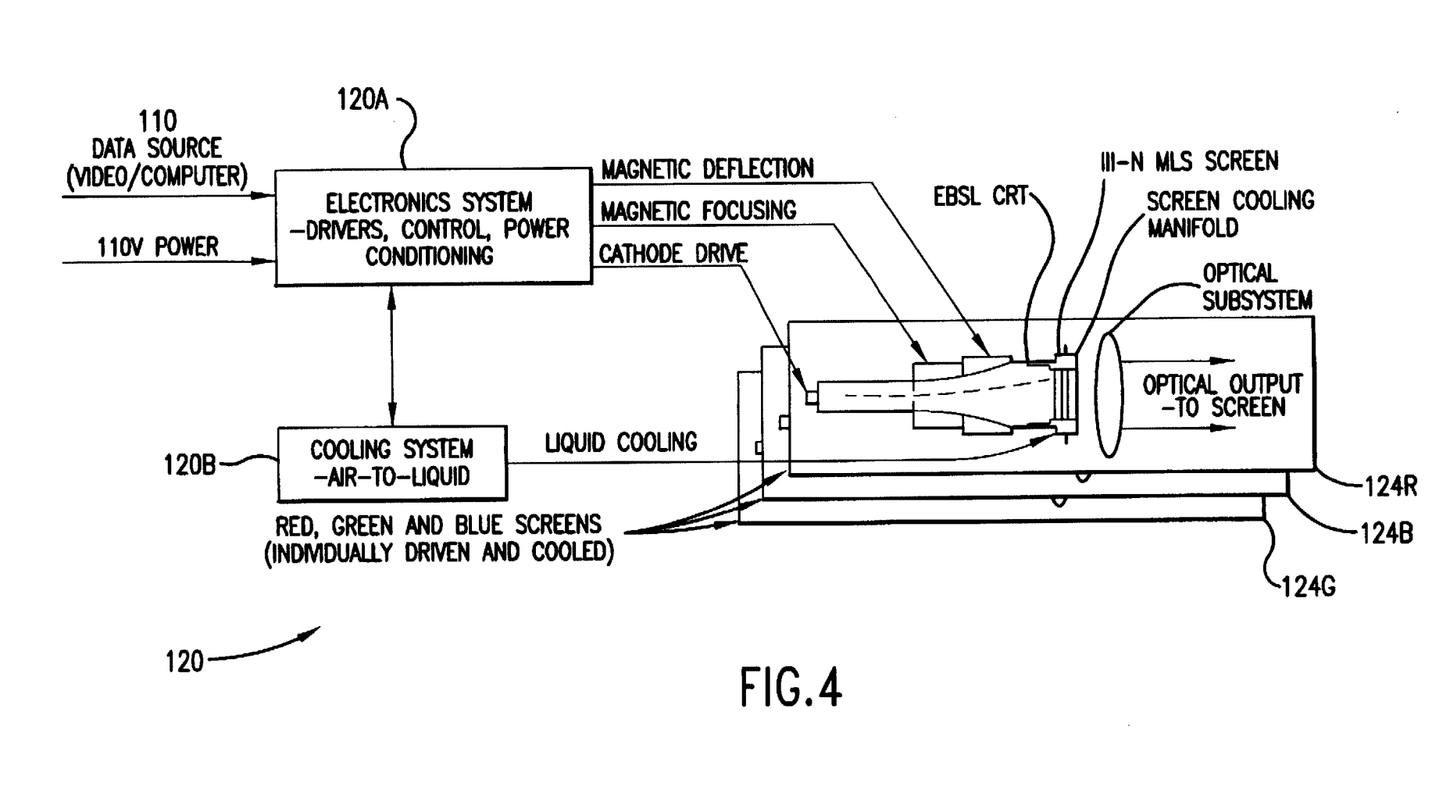
FIG. 4 depicts CRTs and peripheral equipment which can be fabricated using the EBSL screen of FIG. 3.
Figure 5:
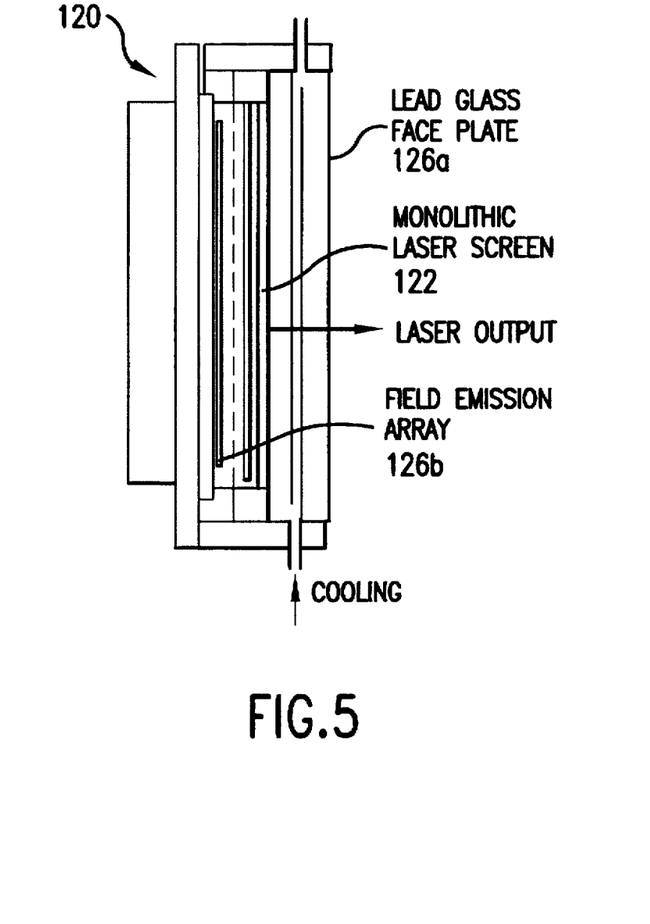
FIG. 5 depicts an alternative flat panel display which can be fabricated using the EBSL screen of FIG. 3.

A detailed description of the EBSL projector 120 will now be presented with reference to FIGS. 3–5. It should, however, be clearly understood that the present invention is not limited to the use an EBSL projector 120; the present invention advantageously can be implemented using a scanning laser source. For example, the mechanical system for scanning a rectangular screen used in generating a holographic display disclosed in U.S. Pat. No. 4,799,103, which patent is incorporated herein by reference for all purposes, beneficially can be used to scan the rear face of the display screen 130. However, it will be noted that the EBSL projector 120 is an electro-optical system having no moving parts; thus, the EBSL projector 120 is a rugged component not subject to mechanical failures and mechanical misalignments.

The EBSL projector 120, which is often referred to as a laser CRT (LCRT), is a display technology that uses an electron-beam-pumped semiconductor laser (EBSL) screen, often configured as a vertical cavity surface emitting laser (VCSEL) to generate a high-brightness laser beam. The LCRT advantageously is applicable to the entire range of consumer and professional display systems, since the LCRT is capable of impressive performance in terms of brightness, resolution, efficiency and chromaticity. In addition, the LCRT advantageously can produce electromagnetic radiation across a broad spectral range, from the short infrared through the visible to the ultraviolet.

Preferably, the EBSL screen 122 illustrated in FIG. 3 can be made from wide band gap II–VI compounds, e.g., CdSSe, etc., or, most preferably, from III–V compounds, e.g., InGaN, etc. As shown in FIG. 3, the active layers of an exemplary EBSL screen 122, which includes multiple quantum wells 122b with associated reflective coatings 122c, form an optical cavity sandwiched between a reflective coating 122a and a sapphire substrate 122d. Advantageously, the EBSL screen 122 can be grown on a sapphire wafer approximately 1 millimeter (mm) thick. Preferably, the EBSL screen 122, which is sometimes referred to as a laser screen, is mounted in a metallic or glass evacuated tube 124, as illustrated in FIG. 4, or it can be coupled to a micro-cathode array 126, i.e., a planar field emitter array, as illustrated in FIG. 5.

With respect to FIG. 4, it will be noted that the projector 120 includes support subsystems such as electronics package 120A, cooling system 120B and optical system 120C. It will also be noted that the projector 120 illustrated in FIG. 4 employs monochromatic EBSL screens 122 in each of tubes 124R, 124B and 124G. Alternatively, a single polychromatic tube 124RBG advantageously can be employed in projector 120. FIG. 5 illustrates the latter type of polychromatic EBSL screen 122 disposed between a glass face plate 126a, e.g., a lead glass face plate, and a planar field emitter array 126b.

In either case, the EBSL screen 122 advantageously can be scanned by a focused electron beam to produce light by stimulated emission at the point incident on the device 122 corresponding to the instantaneous position of the electron beam. The EBSL screen 122 is particularly advantageous in that the device employs an integrally grown output coupling mirror, which makes the entire EBSL monolithic with the sapphire substrate. Additionally, the EBSL screen 122 employs quantum wells to increase the gain of the device in order to reduce the required electron beam penetration and, thus, the operating voltage of the electron source. Also, the monolithic structure eliminates costly polishing steps during fabrication, and improves the thermal properties of the EBSL projector 120 by eliminating at least one epoxy attachment step needed for conventional multi-part structures.

The intrinsic characteristics of the EBSL projector 120 can be summarized as follows:

(1) Brightness. Visible light is produced by stimulated emission with a small coherence length, thereby allowing for several orders of magnitude brighter output than that produced by comparable phosphor screens. In addition, it will be appreciated that the directivity of the emitted laser light beneficially allows virtually all of the emitted laser light to be utilized. An important characteristic of the LCRT is that increased resolution does not inhibit brightness as in liquid crystal display technologies.

(2) Resolution. The resolution of the LCRT is a function of the size of the electron beam spot and the physical dimensions of the scanning field on the laser screen. Therefore, very high resolution is possible, i.e., up to 4,000 scan lines can be accommodated with an electron beam spot size of 30 μm.

(3) Efficiency. The theoretical efficiency of energy-to-light conversion of semiconductor lasers is 36%. This is extremely high when compared to technologies such as light-valves (either liquid crystal or oil film), conventional CRT projectors or actuated-mirror arrays employing gas lasers, all of which typically have efficiencies on the order of one lumen per watt. In contrast, EBSL projectors for consumer display devices will soon be available with outputs of approximately 1500 ANSI lumens while EBSL projectors for high-end professional displays will soon be available with outputs of approximately 5,000–10,000 ANSI lumens.

(4) Color Gamut. Since the laser action tends to suppress all wavelengths of light for which feedback is not present, the light output can be a pure spectral line tuned to within a few nanometers. Moreover, the actual gamut is significantly larger than either conventional CRT phosphors or film. It will be appreciated that a narrow range of output wavelengths within the broad overall range is determined by selection of the semiconductor material used, for example, in epitaxal growth of the EBSL screen 122.

Electron-beam-pumped semiconductor lasers for projection displays employing VCSEL's having multiple quantum well structures, as illustrated in FIG. 3, permit both low threshold and room temperature operation. Advantageously, the EBSL screen 122 can be an III-N, e.g., InGaN, monolithic laser screen (MLS) that is deposited on, for example, a sapphire substrate in a growth reactor. Preferably, the EBSL screen 122 is fabricated using III-Nitride materials, which offers significant lifetime increases when compared to devices constructed from II–VI compounds. In an exemplary case, the EBSL projector 120 includes an III-N MLS having the following operating characteristics:

(1) Brightness of greater than 5000 lumens/(sr-cm$^2$);
(2) Lifetime on the order of 10,000 hrs.;
(3) Ambient operating temperatures, i.e., cryogenic cooling is not required;
(4) Low operating potentials, i.e., <35 kV, to preclude the possibility of X-ray generation; and
(5) Resolution on the order of 1200 lines.

Additional details regarding the fabrication of EBSL, particularly VCSEL, substrates can be found in U.S. Pat. Nos. 5,146,465, 5,182,670, 5,192,987, and 5,385,862, which patents are incorporated herein for all purposes by reference.

The two advantages discussed above, i.e., the high speed refresh rate and high brightness of the EBSL projector 120 and the viewing screen 130, cooperatively enable multiple images to be time sequenced without the persistence problems associated with CRT-based virtual displays. The high power of the EBSL enables the display to be brighter, on average, as a normal CRT. In the exemplary case with respect to a "terrain table," each of a nominal fifteen viewers receives 60 right field frames per second (fps) and 60 left field fps. As will be discussed in greater detail below, the display screen 130 of the 3-D virtual display system 100 has no screen persistence, in contrast to a conventional CRT which exhibits a high degree of screen persistence. Advantageously, the high brightness of the EBSL projector achieves proper eye persistence, rather than screen persistence, for flicker free operation.

As mentioned immediately above, each of the N viewers is allocated 60 fps per eye. Clearly, conventional CRT screens cannot operate at this high of a scan rate because of the persistence of the phosphor screen and the low brightness. Since a laser illuminating a viewing screen does not have any such persistence, i.e., each pixel is on for approximately 1 nanosecond (nsec) during the time that a frame is on the screen 130, the EBSL must be of sufficient brightness to achieve the necessary persistence in the viewer's eye. The persistence in the eye of the viewer is directly proportional to the energy absorbed in the viewer's eye; the greater the energy, the shorter the duration required to achieve the same degree of persistence. The 3-D virtual display system 100 according to the present invention takes advantage of the natural persistence of the eye and relies on it to "fill" in the time gap between each image displayed on the screen 130 directed at a particular one of the N viewers.

Referring again to FIG. 2, in order to produce images which will present each of the N viewers with a true perspective 3-D virtual image, the 3-D virtual display system 100 necessarily requires data regarding the location of each of the N viewers. Preferably, the glasses worn by each of the N viewers includes a small LED which transmits a pulse code to the Hartmann detector 150, or similar device, disposed proximate to the screen 130. Preferably, the optics of the Hartmann detector 150 is located in the center of screen 130 and slightly above the level of the screen surface. Advantageously, a second Hartmann detector 150" can be suspended directly above the Hartmann detector 150 in the event that the precise distance between screen 130 and each of the N viewers is needed for generating respective 3-D virtual images.

As previously discussed, the simple Hartmann type detector 150 preferably is capable of detecting the angle of arrival of the LED pulse code transmitted by the LED 142 of glasses 140. Since the pulses are encoded, each of the N viewers transmits a unique ID code to the Hartmann detector 150, which allows the Hartmann detector 150 to differentiate between viewers and locate a particular viewer with respect to the screen 130. It will be noted that this detector subsystem system relies on a direct line-of-sight between the viewer and the Hartmann detector. An alternative for locating the person is to use a conventional RF-based system, such as the so-called Pohlemus detector system, which operates by triangulating on a receiver mounted on the person and also provides the user's orientation with respect to the screen 130 to the image processor.

Referring back to FIG. 2, once the 3-D graphics processor 110 receives information on each viewer's location from position processor 160, the 3-D graphics processor 110 advantageously can calculate the proper perspective for each respective viewer, load the proper perspective for the viewer in that viewer's time slot, and send out an encoded sync pulse to that viewer to enable that viewer to see his "particular view." Preferably, the encoded sync pulses are generated by LED transmitters 154 which, in an exemplary case, are disposed around the Hartmann detector 150. Alternatively, the LED transmitters 154 advantageously can be located at any position of position having a direct line-of-sight to the viewers. It will be noted that the exemplary 3-D virtual display system 100 uses the transmitted sync pulses to control the operation of each individual pair of glasses 140. In an alterative preferred embodiment, all of the glasses 140 may have a respective preassigned set of frames; the sync pulses can then be provided to all of the glasses 140 to ensure that the internal clock in each pair of glasses 140 does not drift off so that the viewer can no longer see the 3-D virtual images assigned to him. Advantageously, the sync pulses can be generated by the EBSL projector 120 during, for example, the vertical retrace period of one or more of the image pairs, i.e., during any period when an image is not being projected on display screen 130.

Figure 9:
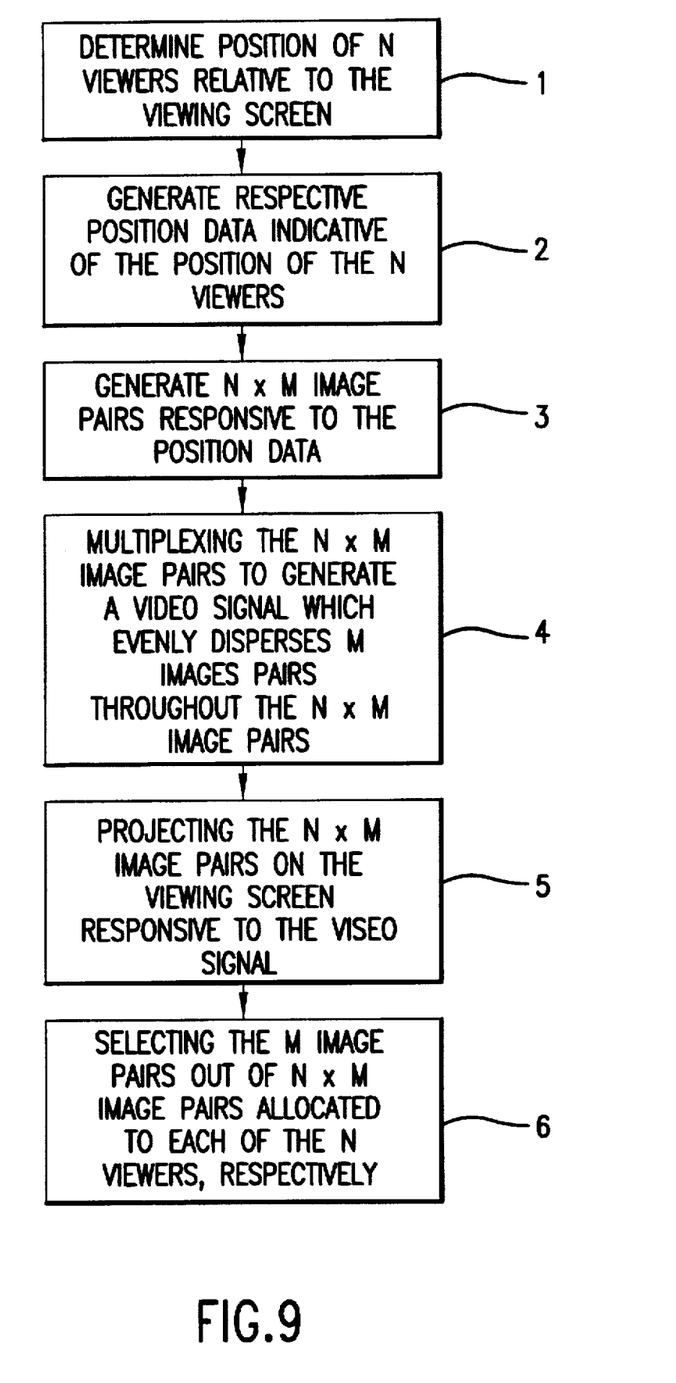
FIG. 9 is a flowchart illustrating the operating sequence of the 3-D virtual display system depicted in FIG. 2.

During operation of the 3-D virtual display system 100 illustrated in FIG. 2, the steps illustrated in FIG. 9 are performed. First, each pair of glasses 140 generates and transmits a unique signature signal, preferably an IR signature signal produced by a LED, to the detector 150. The detector 150 then generates an electrical signal corresponding to each of the N viewers in step 1 and interpolates the N electrical signals in position processor 160 during step 2. Thus, the positions of all N viewers relative to the center of the screen 130 are tracked. It should be mentioned that the position of each of the N viewers can be updated at least once per second although the N positions advantageously can be updated at a faster rate, e.g., every 0.1 seconds.

The position processor 160 transfers position information on each of the N viewers to the 3-D graphic processor 110, which advantageously generates unique image pairs during step 3, thus permitting each of the N viewers to see a true perspective 3-D virtual image. Accordingly, the graphics processor 110 updates each viewer's position and calculates respective new viewer perspective images. It should be mentioned that because of the number of image pairs generated for the N viewers, the 3-D graphics processor 110 preferably is a computer system including parallel processors (not shown). The 3-D graphics processor preferably includes a multiplexer (not shown) for multiplexing the image pairs into their assigned time slots in the video signal during step 5. Following or concurrent with the processing step, the 3-D graphics processor transfers data, which data is preferably red, green and blue (RGB) data, to EBSL projector 120 during step 5. In an exemplary case, one of the 3-D graphics processor 110 and EBSL projector 120 generates sync signals for transmission to glasses 140 either directly or via the LEDs 154 surrounding Hartmann detector 150. The 3-D graphics processor 110 supplies the sync signals in the preferred embodiment of the present invention illustrated in FIG. 2.

Still referring to step 5, the EBSL projector 120 then transmits a sequence of image frames to screen 130. Each viewer, responsive to the transmitted sync signals, receives only the left and right eye frames associated with that viewer during step 6. During other periods of time, the left and right lenses of glasses 140 do not transmit light.

Figure 6:
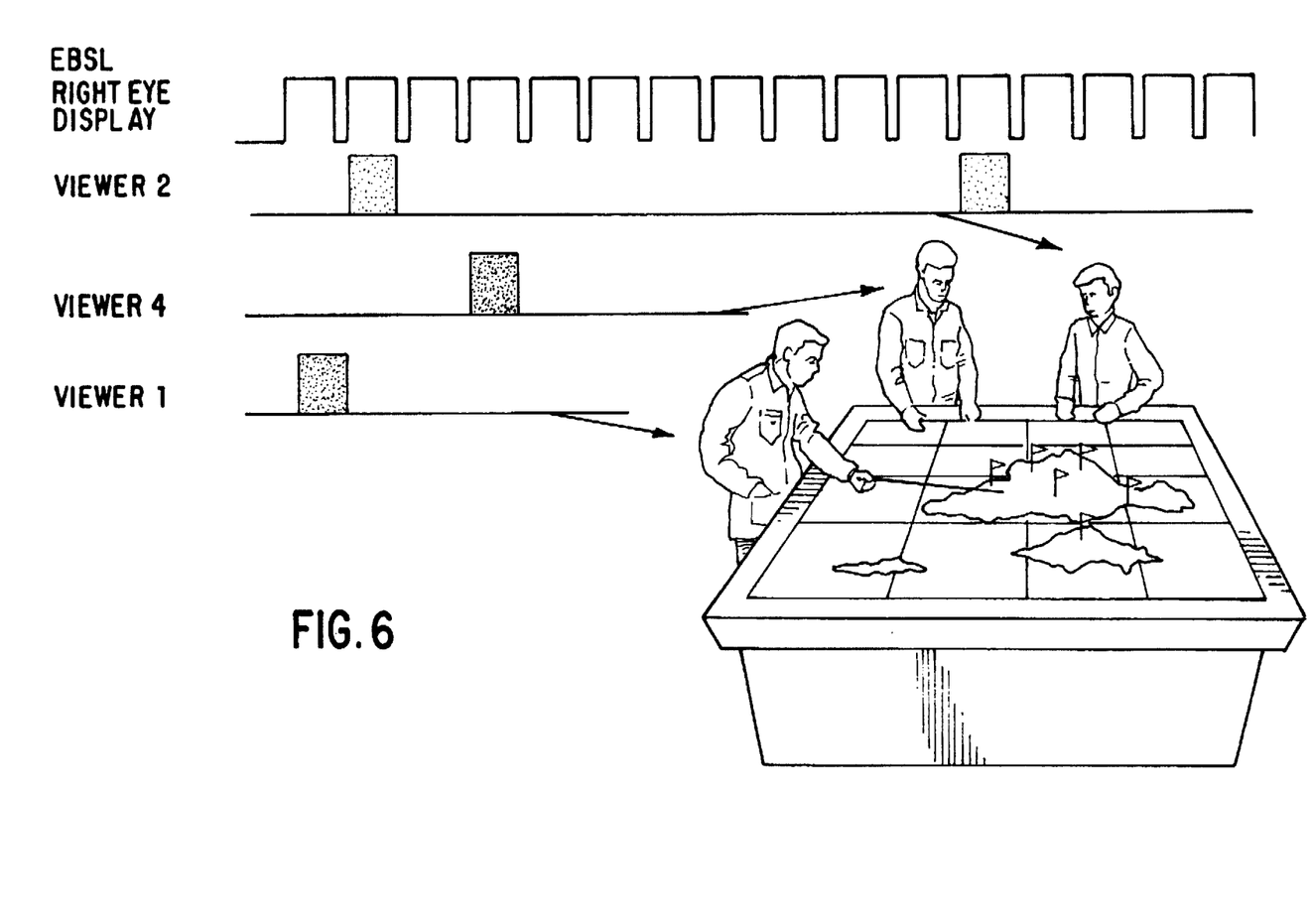
FIG. 6 is a composite waveform diagram and pictorial representation of the 3-D virtual display system according to the present invention which is useful in understanding the operation of the present invention.

The operation of the present invention can best be understood by referring to FIG. 6, wherein three viewers are receiving three separate 3-D virtual images via screen 130. It will be appreciated that the timing patterns for right eye signals repeats every 10th frame; thus, the illustrated embodiment accommodates 10 viewers.

As shown in FIG. 6, the signal denoted EBSL right eye display includes a sequence of right eye frames which have been transmitted in a predetermined order. During the period that the first right eye frame is displayed on screen 130, the right eye lens of viewer 1's glasses 140 is transmissive; thus viewer 1, and only viewer 1, sees the first right frame. During the second right eye frame, only viewer 2 receives the second right eye frame. In addition, during the fourth right eye frame, only viewer 4 sees the fourth right eye frame. It will be appreciated that the sequence of right eye frames repeats after the tenth right eye frame and, thus, viewer 10 sees the 10th, 20th, and 30th frames, etc. Thus, each viewer depicted in FIG. 6 sees the "terrain table" at a perspective corresponding to the viewer's position with respect to the screen 130. It should also be mentioned that each viewer advantageously can be made to see an identical 3-D virtual image regardless of the viewer's position relative to the screen. The latter situation is particularly important in educational settings such as military training facilities as it ensures that all students "see" the 3-D virtual image from the instructor's viewpoint.

It should be mentioned that although the frame rate of the EBSL projector 120 is considerably faster than that of a conventional CRT, the information rate is not without limits. In an exemplary case mentioned above where each pixel is illuminated for approximately 1 nsec, the upper limit on the EBSL frame rate is between 1000 and 2500 fps, depending on the number of pixels per frame. For a typical VGA display having 800×600 pixels, the maximum frame rate is approximately 2000 fps. This frame rate is perfectly acceptable of low resolution 3-D virtual images and the left and right eye frames can be multiplexed with one another so that the left eye frames are uniformly dispersed within the right eye frames. For example, the 3-D virtual display system 100 depicted in FIG. 6 advantageously can be adapted to accommodate five viewers so that the first five frames are right eye frames, the second five frames are left eye frames, the next five frames are again right eye frames, and so on. It should be mentioned that any sequence which evenly (or even unevenly) disperses the left and right eye frames is considered to be within the scope of the present invention.

While the above-described multiplexing technique is acceptable for low numbers of viewers and/or lower resolution images, increasing the number of viewers or the number of pixels per frame can quickly consume the available information bandwidth. For that reason, the 3-D virtual display system 100 according to the present invention also includes measures to decrease the bandwidth associated with each image pair. In an exemplary case, the left and right eye frames are simultaneously projected via first and second polarization filters having polarization axes which are perpendicular to one another. Images passing through these polarization filters are viewed through glasses 140 containing appropriate polarization filters corresponding to the output polarization filters. Since the exemplary case under discussion permits the left and right eye frames to be multiplexed together for display on screen 130, the frame rate advantageously can be effectively doubled. Alternatively, the number of frames per second which must be projected by EBSL projector 120 onto screen 130 can be reduced by the simple expedient of transmitting unequal numbers of left and right eye frames per unit time, where the unit time is less than 1 second. For example, in a first unit time 2 right eye frames are transmitted for every left eye frame; during the second unit time, the number of right and left eye frames is reversed. Each of the N viewers would still receive enough information to perceive the images as flicker free 3-D virtual images provided that the minimum left or right eye frame rate per viewer is maintained greater than or equal to about 24 fps, i.e., the frame rate employed in conventional movie theaters.

Figure 7:
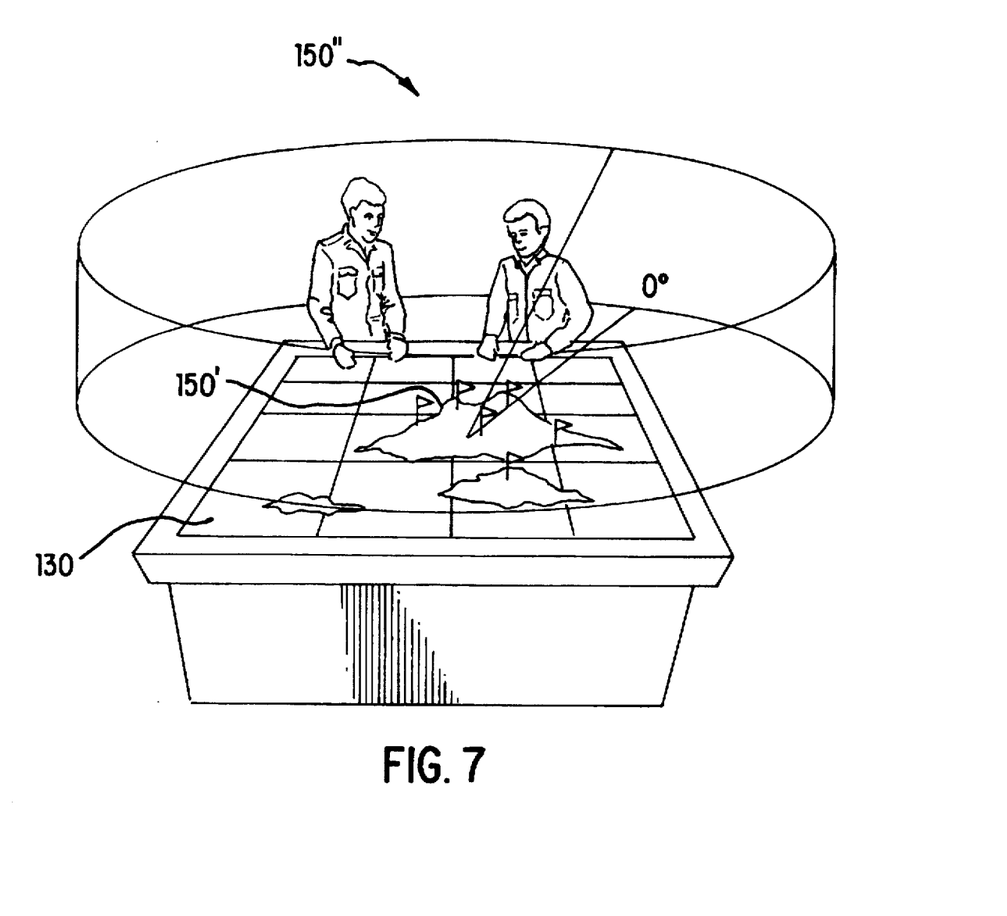
FIG. 7 is an illustration of a horizontal screen 3-D virtual display system according to the present invention.
Figure 8:
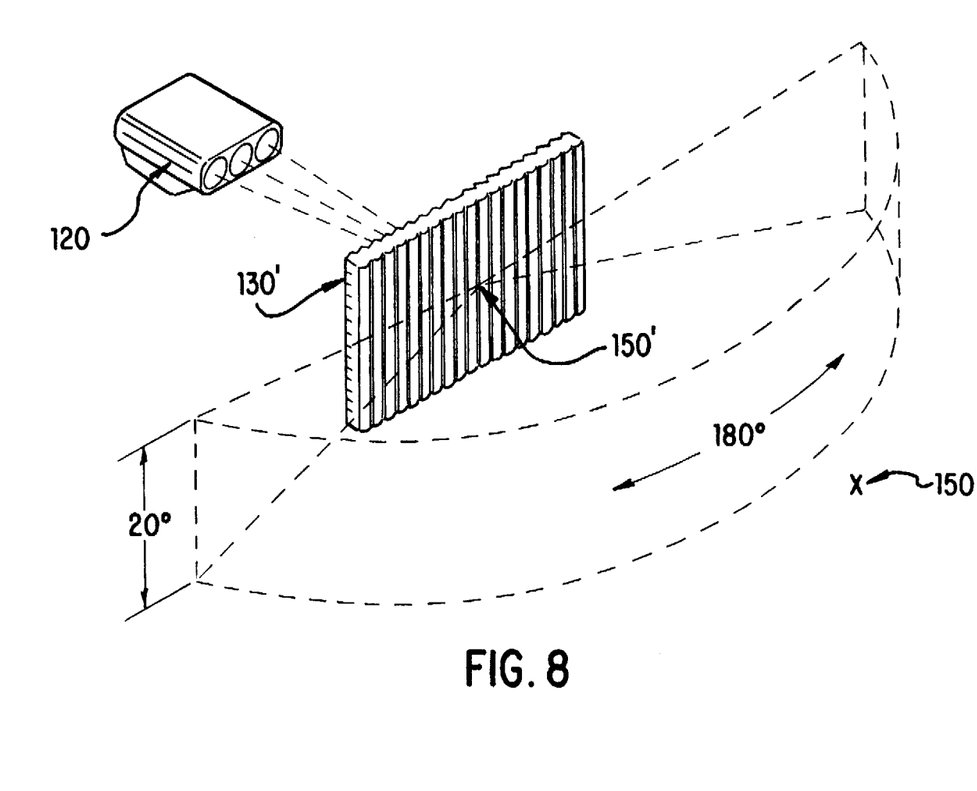
FIG. 8 is an illustration of a vertical screen 3-D virtual display system according to the present invention.

It will be appreciated that the brightness of the display screen 130 is always of concern. Advantageously, either a holographic rear projection screen or refractive element rear projection screen can be employed so that the light incident on the projection screen 130 can be preferentially scattered into a desired volume. As shown in FIG. 7, the rear projection screen 130 preferentially scatters the incident light at an angle that forms a cylindrical view area with high gain in the direction of the viewers. In the alternative embodiment illustrated in FIG. 8, wherein a vertical screen 130' replaces the horizontal screen 130, the high gain region is in a half cylinder view area that is orientated perpendicular to the screen 130. It should be appreciated that the primary difference between the lens elements incorporated into the screens 130 and 130' in FIGS. 7 and 8 is that the lens elements are disposed in concentric circles on screen 130 and in vertical stripes on screen 130'. It should also be appreciated that the cylindrical or semi-cylindrical zone of light scattered from the projection screens 130, 130' will conserve energy and provide the brightest possible display.

It should be mentioned that the primary use of the 3-D virtual display system according to the present invention is as a real time three-dimensional information display for military operations such as command, control, communications, computers and intelligence (C4I) applications, situational awareness training, military and commercial air traffic control systems, air space management, littoral operations including submarine navigation, teaching tools for schools and visualization tools for mechanical designers, and entertainment displays for advanced games. The 3-D virtual display system according to the present invention is also ideal for battlefield simulations, rehearsals, and mission planning exercises and requirements.

It should also be mentioned that in an exemplary case of a theater having a vertically oriented screen 130, as illustrated in FIG. 8, some of the viewers seated in the front of a conventional theater are normally unable to observe the entire screen at any one time. In contrast, the 3-D virtual images directed toward these patrons by the 3-D virtual display system 100, in addition to being true perspective 3-D virtual images, advantageously may be sized for optimal viewing. Thus, each viewer advantageously can view 3-D virtual images comfortably irrespective of the viewer's distance from the screen 130. Advantageously, the system 100 can also be configured to present the same view to each viewer, when necessary. Although a preferred embodiment according to the present invention was described in terms of a single EBSL projector 120, it will be appreciated that two or more projectors 120 advantageously can be used in conjunction with a single piece or multiple panel display screen 130 to produce the 3-D virtual display system 100 of any desired size.

The 3-D virtual display system 100 of the present invention is capable of time multiplexing 3-D views at a sufficiently rapid rate that there is no perceived flicker of the image. In addition, the 3-D virtual display system 100 provides the ability to time multiplex 3-D images without generating "ghosts," which are generally attributable to the persistence of the conventional CRT monitor. In conventional display devices such as CRTs, the projected images decay away slowly, which is what limits conventional CRTs from being able to provide a true perspective display. It should also be mentioned that the high brightness of the EBSL projector combined with the high gain rear projection screen advantageously enables the projection time for each image to be sufficiently short that the persistence in the eye fuses the image rather than the persistence on the screen fusing the image. The net result is the ability to display thousands of images per second which allows 10's of viewers to each have their own true perspective 3-D virtual image.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A video signal driving a high-brightness, substantially zero-persistence image projector generating N three-dimensional (3-D) virtual images from image pairs including left and right images, said video signal comprising N×M of said image pairs, wherein:

N is an integer greater than 1;

M is an integer equal to a number of image pairs per second applied to the high-brightness, substantially zero persistence image projector required to produce a flicker-free one of said 3-D virtual images;

N×M is a total number of image pairs transmitted and applied to the high-brightness, substantially zero persistence image projector during a one second period; and said N×M image pairs are multiplexed such that the M image pairs generating an Nth one of the 3-D virtual images are separated from one another by at least one of said N×M image pairs generating a (N−1)th one of the 3-D virtual images.

2. The video signal as recited in claim 1, wherein the product of N×M is greater than or equal to 100.

3. The video signal as recited in claim 1, wherein the product of N×M is greater than or equal to 1000.

4. The video signal as recited in claim 1, wherein the left and right images forming said image pairs are superimposed on one another.

5. The video signal as recited in claim 1, wherein said one second period comprises N×M time slots and wherein the M image pairs generating said Nth one of the 3-D virtual images occupy respective Nth, 2Nth, 3Nth, ..., MNth ones of said N×M times slots.

6. A three-dimensional (3-D) virtual display system for displaying a flicker-free 3-D virtual image to each of N viewers located at different positions about a viewing screen, wherein N is an integer greater than 1, comprising:

a projector for generating N×M image pairs, wherein M is an integer representing a number of image pairs required to produce one said flicker-free 3-D virtual image, and wherein said N×M image pairs are multiplexed so as to evenly disperse said M image pairs throughout said N×M image pairs;

a detector for determining the position of each of the N viewers relative to the viewing screen and generating respective position data;

a graphics processor for generating a video signal comprising said N×M image pairs responsive to said position data; and N selectors associated with the N viewers for selecting the M image pairs out of said N×M image pairs allocated to each of the N viewers, respectively.

7. The 3-D virtual display system as recited in claim 6, wherein each of the N viewers supports an electromagnetic transmitter producing a respective coded pulse uniquely identifying each of the N viewers, and wherein said detector comprises circuitry for extrapolating the position of each of the N viewers responsive to the respective coded pulse.

8. The 3-D virtual display system as recited in claim 7, wherein the position is relative position, wherein each of the N viewers supports an infrared (IR) electromagnetic transmitter producing a respective IR coded pulse uniquely identifying said each of the N viewers, and wherein said detector comprises an electro optical detector for extrapolating said relative position of each of the N viewers responsive to the respective IR coded pulse.

9. The 3-D virtual display system as recited in claim 7, wherein the position is absolute position, wherein each of the N viewers supports an infrared (IR) electromagnetic transmitter producing a respective IR coded pulse uniquely identifying said each of the N viewers, and wherein said detector comprises a pair of electro-optical detectors for extrapolating said absolute position of each of the N viewers responsive to the respective IR coded pulse.

10. The 3-D virtual display system as recited in claim 6, wherein said projector comprises an electron-beam-pumped semiconductor laser.

11. The 3-D virtual display system as recited in claim 10, wherein said electron-beam-pumped semiconductor laser comprises a vertical cavity surface emitting laser.

12. The 3-D virtual display system as recited in claim 10, wherein said electron-beam-pumped semiconductor laser comprises a monochromatic electron-beam-pumped semiconductor laser.

13. The 3-D virtual display system as recited in claim 10, wherein said electron-beam-pumped semiconductor laser comprises a planar field emitter array.

14. The 3-D virtual display system as recited in claim 6, wherein the product of N×M is greater than or equal to 100.

15. The 3-D virtual display system as recited in claim 6, wherein the product of N×M is greater than or equal to 1000.

16. The 3-D virtual display system as recited in claim 6, wherein each of said N selectors comprises a pair of liquid crystal shutters synchronized to selected M image pairs of said N×M image pairs.

17. The 3-D virtual display system as recited in claim 16, wherein left and right images within each of said N×M image pairs are polarization separated from one another, and wherein each of said N selectors further comprise left and right polarization filters corresponding to said left and right images.

18. The 3-D virtual display system as recited in claim 17, wherein said left and right images are superimposed onto one another.

19. A three-dimensional (3-D) virtual display system for displaying a flicker-free 3-D virtual image to each of N viewers located at different positions about a horizontally disposed viewing screen, wherein N is an integer greater than 1, comprising:

a laser projector for generating N×M image pairs responsive to a video signal comprising said N×M image pairs, wherein M is an integer representing a number of image pairs required to produce one said flicker-free 3-D virtual image, and wherein said N×M image pairs are multiplexed so as to evenly disperse said M image pairs throughout said N×M image pairs;

N transmitters, each of said N transmitters being associated with a respective one of the N viewers, and each of said N transmitters generating a unique coded pulse;

a detector for determining the position of each of the N viewers relative to the viewing screen responsive to the respective unique coded pulse and for generating respective position data;

a graphics processor for generating said video signal responsive to said position data; and N selectors associated with the N viewers for selecting the M image pairs out of said N×M image pairs allocated to each of the N viewers, respectively.

20. The 3-D virtual display system as recited in claim 19, wherein the position is absolute position, and wherein said detector comprises a pair of vertically disposed electro-optical detectors for extrapolating said absolute position of each of the N viewers responsive to the respective unique coded pulse.

21. The 3-D virtual display system as recited in claim 19, wherein said laser projector comprises an electron-beam-pumped semiconductor laser.

22. The 3-D virtual display system as recited in claim 19, wherein said laser projector comprises a laser scanner.

23. The 3-D virtual display system as recited in claim 19, wherein the product of N×M is greater than or equal to 100.

24. The 3-D virtual display system as recited in claim 19, wherein each of said N selectors comprises a pair of liquid crystal shutters synchronized to select M image pairs of said N×M image pairs.

25. A three-dimensional (3-D) virtual display system for displaying a flicker-free 3-D virtual image to each of N viewers randomly dispersed about a viewing screen, wherein N is an integer greater than 1, comprising:

first means for determining the position of each of the N viewers relative to the viewing screen responsive to N coded pulses associated with the respective N viewers, and for generating respective position data;

second means for generating a video signal comprising N×M image pairs responsive to said position data;

third means for projecting said N×M image pairs on the viewing screen responsive to said video signal, wherein M is an integer representing a number of image pairs required to produce one said flicker-free 3-D virtual image, and wherein said N×M image pairs are multiplexed so as to evenly disperse said M image pairs throughout said N×M image pairs;

fourth means associated with the N viewers for selecting the M image pairs out of said N×M image pairs allocated to each of the N viewers, respectively.

26. The 3-D virtual display system as recited in claim 25, wherein said third means comprises an electron-beam-pumped semiconductor laser.

27. The 3-D virtual display system as recited in claim 25, wherein said third means comprises a laser scanner.

28. The 3-D virtual display system as recited in claim 25, wherein each pixel generated by said third means is displayed on the viewing screen for approximately 1 nanosecond.

29. A method for operating a three-dimensional (3-D) virtual display system for displaying a flicker-free 3-D virtual image to each of N viewers randomly dispersed about a viewing screen, wherein N is an integer greater than 1, and wherein the 3-D virtual display system includes circuitry for determining the position of each of the N viewers relative to the viewing screen, a graphics processor for generating a video signal comprising N×M image pairs, a projector for projecting the N×M image pairs on the viewing screen, wherein M is an integer representing a number of image pairs required to produce one flicker-free 3-D virtual image, and N selectors associated with each of the N viewers, respectively, said method comprising the steps of:

determining the position of each of the N viewers relative to the viewing screen;

generating respective position data indicative of the positions of the N viewers;

generating N×M image pairs responsive to said position data;

multiplexing said N×M image pairs to thereby generate a video signal and to thereby evenly disperse said M image pairs throughout the N×M image pairs;

projecting said N×M image pairs on the viewing screen responsive to said video signal; and selecting the M image pairs out of said N×M image pairs allocated to each of the N viewers, respectively.

30. The method as recited in claim 29, wherein the product of N×M is greater than or equal to 120.

* * * * *